United States Patent
Yamashita et al.

(10) Patent No.: US 8,400,553 B2
(45) Date of Patent: Mar. 19, 2013

(54) IMAGE PICKUP LENS AND IMAGE PICKUP DEVICE USING THE SAME

(75) Inventors: Masatoshi Yamashita, Osaka (JP); Takumi Iba, Kyoto (JP); Nami Nagamori, Hyogo (JP)

(73) Assignee: Panasonic Corporation, Osaka (JP)

( * ) Notice: Subject to any disclaimer, the term of this patent is extended or adjusted under 35 U.S.C. 154(b) by 46 days.

(21) Appl. No.: 13/258,955

(22) PCT Filed: Apr. 14, 2010

(86) PCT No.: PCT/JP2010/002686
§ 371 (c)(1),
(2), (4) Date: Sep. 22, 2011

(87) PCT Pub. No.: WO2010/134260
PCT Pub. Date: Nov. 25, 2010

(65) Prior Publication Data
US 2012/0019706 A1    Jan. 26, 2012

(30) Foreign Application Priority Data
May 21, 2009 (JP) ................. 2009-123321

(51) Int. Cl.
*H04N 5/225* (2006.01)
*G02B 3/02* (2006.01)
*G02B 9/34* (2006.01)

(52) U.S. Cl. ............. 348/340; 359/715; 359/773

(58) Field of Classification Search .......... 348/335, 348/340; 359/715, 772, 773
See application file for complete search history.

(56) References Cited

U.S. PATENT DOCUMENTS

| 8,149,523 B2 * | 4/2012 | Ozaki ............... 359/773 |
| 8,194,333 B2 * | 6/2012 | Iba et al. ........... 359/773 |
| 2007/0242370 A1 | 10/2007 | Fukuta et al. |
| 2008/0239138 A1 | 10/2008 | Sano |
| 2010/0014175 A1 | 1/2010 | Nio |

FOREIGN PATENT DOCUMENTS

| JP | 2007-286153 | 11/2007 |
| JP | 2008-242180 | 10/2008 |
| JP | 2009-069194 | 4/2009 |
| JP | 2009-069195 | 4/2009 |
| JP | 2009-069196 | 4/2009 |
| WO | 2008/078708 | 7/2008 |

* cited by examiner

*Primary Examiner* — David N Spector
(74) *Attorney, Agent, or Firm* — Hamre, Schumann, Mueller & Larson, P.C.

(57) ABSTRACT

An image pickup lens capable of providing an angle of view of up to 70° or higher is provided. The image pickup lens can also be reduced in size and various aberrations associated with the lens can be corrected favorably, so that the image pickup lens is compatible with a high-pixel image pickup element. The image pickup lens 7 includes, in order from an object side to an image surface side: a first lens 1 that is a biconvex lens having positive power; a second lens 2 that has negative power and whose lens surface facing the image surface side is concave; a third lens 3 that is a meniscus lens having positive power and whose lens surface facing the image surface side is convex; and a fourth lens 4 that has negative power, whose lens surfaces are both aspherical and whose lens surface facing the image surface side is concave near an optical axis. The image pickup lens 7 satisfies the following conditional expressions (1) and (2), where f is the focal length of the overall optical system, Y' is the maximum image height, and TL is the overall length of the optical system:

$$1.20 < f/Y' < 1.35 \quad (1)$$
$$TL/Y' < 2.0 \quad (2).$$

7 Claims, 6 Drawing Sheets

IMAGE PICKUP LENS AND IMAGE PICKUP DEVICE USING THE SAME

TECHNICAL FIELD

The present invention relates to an image pickup lens suited for small mobile products equipped with an image pickup device, such as a mobile phone, a digital camera and a small camera, and also to an image pickup device using the image pickup lens.

BACKGROUND ART

In recent years, small mobile products equipped with an image pickup device (a camera module), such as a mobile phone, have become widely popular, and taking pictures instantly with such small mobile products has become a common practice. For image pickup devices that are incorporated in such small mobile products, an image pickup lens composed of four lenses is proposed (see Patent document 1, for example). This image pickup lens is small and can ensure a wide angle of view. In addition, various aberrations associated with the lens can be corrected favorably. Thus, the image pickup lens is compatible with a high-pixel image pickup element (i.e., can improve the image quality of captured images).

The image pickup lens described in Patent document 1 comprises, in order from the object side to the image surface side: a first lens that is a biconvex lens having positive power; a second lens that has negative power and whose lens surface facing the image surface side is concave; a third lens that is a meniscus lens having positive power and whose lens surface facing the image surface side is convex; and a fourth lens that has negative power, whose lens surfaces are both aspherical and whose lens surface facing the image surface side is concave near the optical axis. The image pickup lens satisfies the following conditional expression (5), where R22 is the radius of curvature of the lens surface of the second lens facing the image surface side and f is the focal length of the overall optical system.

$$0.2 < R22/f < 0.6 \qquad (5)$$

Meanwhile, to further enhance the performance of image pickup devices used for small mobile products such as a mobile phone, there are demands for a small image pickup lens that can provide a wide angle of view of up to about 70° or higher in addition to being compatible with a small and high-pixel image pickup element.

PRIOR ART DOCUMENT

Patent Document

Patent Document 1: JP 2007-286153 A

DISCLOSURE OF INVENTION

Problem to be Solved by the Invention

However, the image pickup lens described in Patent document 1 can only provide an angle of view of up to about 60° to 65°. Thus, a wide angle of view of up to about 70° or higher cannot be achieved by this image pickup lens.

With the foregoing in mind, it is an object of the present invention to provide an image pickup lens that can provide an angle of view of up to 70° or higher. The image pickup lens can also be reduced in size and various aberrations associated with the lens can be corrected favorably, so that the image pickup lens is compatible with a high-pixel image pickup element. It is also an object of the present invention to provide an image pickup device using the image pickup lens.

Means for Solving Problem

In order to achieve the above objects, the image pickup lens of the present invention includes, in order from an object side to an image surface side: a first lens that is a biconvex lens having positive power; a second lens that has negative power and whose lens surface facing the image surface side is concave; a third lens that is a meniscus lens having positive power and whose lens surface facing the image surface side is convex; and a fourth lens that has negative power, whose lens surfaces are both aspherical and whose lens surface facing the image surface side is concave near the optical axis. The image pickup lens satisfies the following conditional expressions (1) and (2), where f is the focal length of the overall optical system, Y' is the maximum image height, and TL is the overall length of the optical system.

$$1.20 < f/Y' < 1.35 \qquad (1)$$

$$TL/Y' < 2.0 \qquad (2)$$

According to the configuration of the image pickup lens of the present invention, the image pickup lens is composed of a small number of lenses and satisfies the conditional expression (2), so that a small (small overall optical length) image pickup lens can be achieved. Further, since the first lens is a biconvex lens, its positive power can be dispersed to each of the lens surfaces. Thus, it is possible to provide an image pickup lens that introduces less aberration and can be reduced in size with ease. Further, the image pickup lens uses the second lens whose lens surface facing the image surface side is concave and the third lens that is a meniscus lens whose lens surface facing the image surface side is convex. Thus, the angle at which a ray enters the second lens and the third lens can be reduced to reduce ray aberration. Further, because the lens surfaces of the fourth lens are both aspherical, distortion and a field curvature can be corrected favorably. Further, because the image pickup lens satisfies the conditional expression (1), a wide angle of view of up to 70° or higher can be achieved.

For the reasons mentioned above, according to the configuration of the image pickup lens of the present invention, it is possible to provide an image pickup lens that can provide an angle of view of up to 70° or higher. The image pickup lens also can be reduced in size and various aberrations associated with the lens can be corrected favorably, so that the image pickup lens is compatible with a high-pixel image pickup element (e.g., from a CMOS image sensor having a pixel pitch of 1.75 μm and a pixel count of 5 mega pixels to a CMOS image sensor having a pixel pitch of 1.4 μm and a pixel count of 8 mega pixels) incorporated in a small mobile product, such as a mobile phone.

Further, in the configuration of the image pickup lens of the present invention, it is preferable that the image pickup lens satisfies the following conditional expression (3), where R11 is the radius of curvature of a lens surface of the first lens facing the object side and R12 is the radius of curvature of a lens surface of the first lens facing the image surface side.

$$1.05 < |R11/R12| < 3.0 \qquad (3)$$

According to this preferred example, the power of the lens surface of the first lens facing the image surface side becomes larger than that of the lens surface facing the object side, which makes it not only possible to reduce the size of the image pickup lens and to provide a wide angle of view, but also to correct various aberrations, spherical aberration and axial chromatic aberration in particular, more favorably.

Further, in the configuration of the image pickup lens of the present invention, it is preferable that the image pickup lens satisfies the conditional expression (4), where ν1 is the Abbe's number of the first lens at the d line (587.5600 nm).

$$60 < \nu 1 \quad (4)$$

In this way, by using a glass lens that satisfies the conditional expression (4) as the first lens having large power, various aberrations, chromatic aberration in particular, can be corrected favorably even if the space between the lenses is reduced. Thus, according to this preferred example, the size of the image pickup lens can be further reduced.

In this case, it is preferable that the second lens to the fourth lens are plastic lenses. According to this preferred example, the use of low-cost plastic lenses for the second lens to the fourth lens allows a reduction in the cost of the image pickup lens. Further, the use of plastic lenses for the second lens to the fourth lens in this way makes the molding of the lenses including providing an aspherical shape and shaping the edge part easier. And as the flexibility in designing the shape of the edge part increases, the second lens to the fourth lens can be designed to have a structure that prevents a decline in the quality of a captured image resulting from a flare or ghost or the edge part can be designed to have a shape that makes assembly of the image pickup lens easy.

Further, in the configuration of the image pickup lens of the present invention, the first lens to the fourth lens are all plastic lenses. According to this preferred example, the use of low-cost plastic lenses for the first lens to the fourth lens allows a reduction in the cost of the image pickup lens. Further, the use of plastic lenses for the first lens to the fourth lens in this way makes the molding of the lenses including providing an aspherical shape and shaping the edge part easier. And as the flexibility in designing the shape of the edge part increases, the first lens to the fourth lens can be designed to have a structure that prevents a decline in the quality of a captured image resulting from a flare or ghost or the edge part can be designed to have a shape that makes assembly of the image pickup lens easy. Also in this case, it is preferable that the lens surface of the third lens facing the object side is aspherical, and the lens surface of the third lens facing the object side has at least one inflection point at a peripheral portion thereof situated within the effective diameter of the lens surface of the third lens facing the object side and apart from the optical axis. Also in this case, it is preferable that the lens surface of the fourth lens facing the object side has at least one inflection point at a peripheral portion thereof situated within the effective diameter of the lens surface of the fourth lens facing the object side and apart from the optical axis. According to these preferable configurations, it is possible to correct favorably aberration resulting from a ray that forms an image on the periphery of the image pickup surface of the image pickup element. Thus, the image quality of captured images can be further improved.

Further, the image pickup device according to the present invention includes: an image pickup element for converting an optical signal corresponding to an object into an image signal and outputting the image signal; and an image pickup lens for forming an image of the object onto an image pickup surface of the image pickup element. As the image pickup lens, the image pickup device uses the image pickup lens of the present invention.

According to the configuration of the image pickup device of the present invention, the image pickup device uses the image pickup lens of the present invention as the image pickup lens. Thus, it is possible to provide a small and high-performance image pickup device that can ensure an angle of view of up to 70° or higher, and furthermore, a small and high-performance mobile product equipped with the image pickup device, such as a mobile phone.

Effects of the Invention

As described above, according to the present invention, it is possible to provide an image pickup lens that can provide an angle of view of up to 70° or higher. The image pickup lens also can be reduced in size and various aberrations associated with the lens can be corrected favorably, so that the image pickup lens is compatible with a high-pixel image pickup element (e.g., from a CMOS image sensor having a pixel pitch of 1.75 μm and a pixel count of 5 mega pixels to a CMOS image sensor having a pixel pitch of 1.4 μm and a pixel count of 8 mega pixels) incorporated in a small mobile product, such as a mobile phone. It is also possible to provide a high-performance image pickup device using the image pickup lens.

BRIEF DESCRIPTION OF THE DRAWINGS

FIG. 2(a) is a graph of spherical aberration (graph of axial chromatic aberration), FIG. 2(b) is a graph of astigmatism, and FIG. 2(c) is a graph of distortion.

FIG. 4(a) is a graph of spherical aberration (graph of axial chromatic aberration), FIG. 4(b) is a graph of astigmatism, and FIG. 4(c) is a graph of distortion.

FIG. 6(a) is a graph of spherical aberration (graph of axial chromatic aberration), FIG. 6(b) is a graph of astigmatism and FIG. 6(c) is a graph of distortion.

DESCRIPTION OF THE INVENTION

Hereinafter, the present invention will be described in more detail by way of embodiments.

[Embodiment 1]

Figure 1:
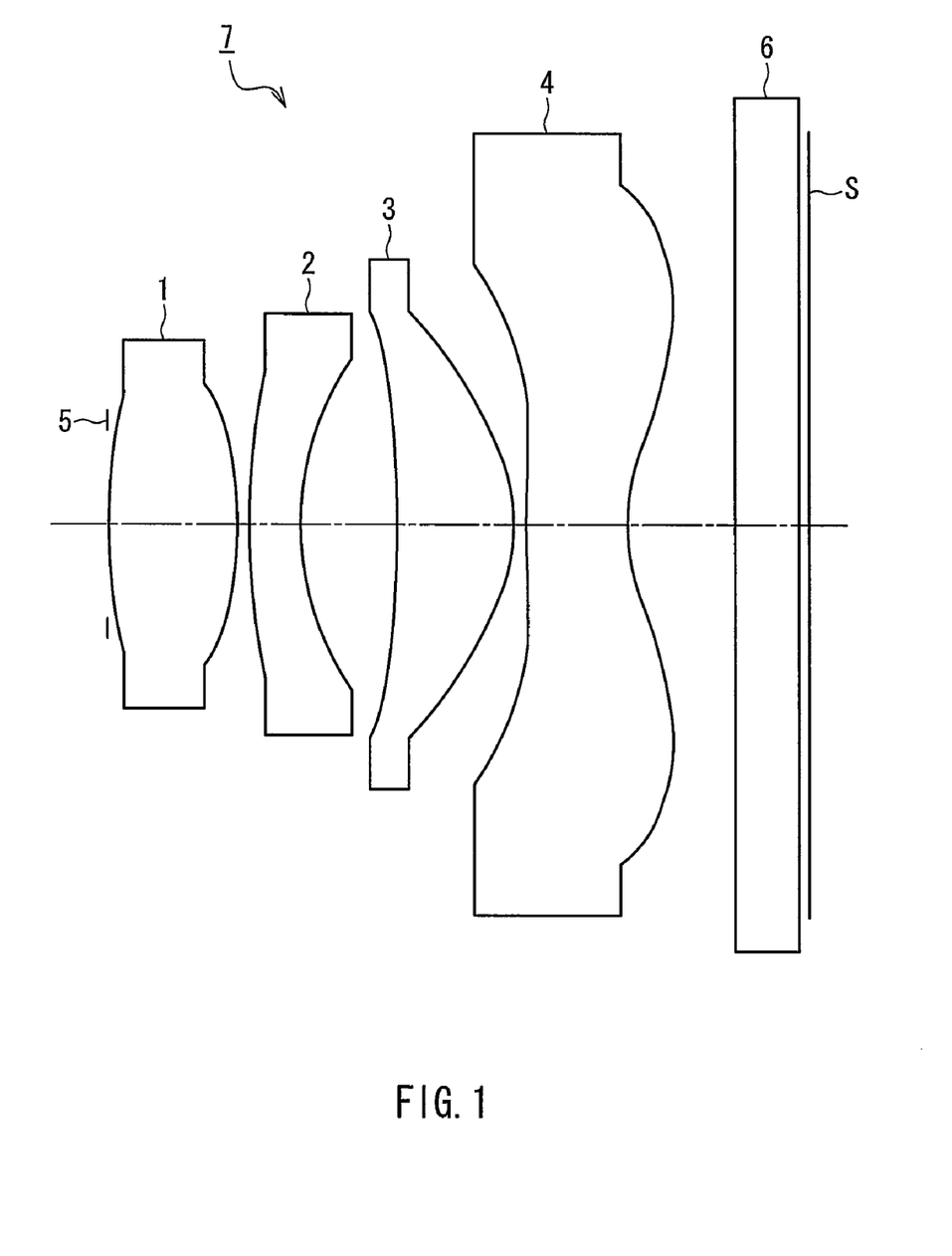
FIG. 1 is a layout drawing showing a configuration of an image pickup lens according to Embodiment 1 of the present invention.

FIG. 1 is a layout drawing showing a configuration of an image pickup lens according to Embodiment 1 of the present invention.

As shown in FIG. 1, an image pickup lens 7 according to the present embodiment includes, in order from the object side (the left side in FIG. 1) to the image surface side (the right side in FIG. 1); an aperture stop 5; a first lens 1 that is a biconvex lens having positive power; a second lens 2 that is a meniscus lens having negative power and whose lens surface facing the image surface side is concave; a third lens 3 that is a meniscus lens having positive power and whose lens surface facing the image surface side is convex; and a fourth lens 4 that has negative power, whose lens surfaces are both aspherical and whose lens surface facing the image surface side is concave near the optical axis. Here, the term power refers to an amount defined by the inverse of a focal length. The image pickup lens 7 is a single focus lens used for imaging that forms an optical image (forming an image of an object) onto an image pickup surface S of an image pickup element (e.g., a CCD), and the image pickup element converts an optical signal corresponding to the object into an image signal and outputs the image signal. The image pickup element and the image pickup lens 7 are used to form an image pickup device.

A transparent parallel plate 6 is disposed between the fourth lens 4 and the image pickup surface S of the image pickup element. Here, the parallel plate 6 is a plate that is equivalent to an optical low-pass filter, an IR-cut filter and a faceplate (cover glass) of the image pickup element.

The surfaces from the lens surface of the first lens 1 facing the object side to the surface of the parallel plate 6 facing the image surface side (hereinafter also referred to as "optical surfaces") will be referred to as, in order from the object side, a "first surface", a "second surface", a "third surface", a "fourth surface" . . . an "eighth surface", a "ninth surface", and a "tenth surface", respectively (the same applies also to Embodiments 2 and 3 described later).

The aspherical shape of each lens surface can be given by the following formula 1 (the same applies also to Embodiments 2 and 3 described later).

$$X = \frac{\frac{Y^2}{R_0}}{1+\sqrt{1-(\kappa+1)\left(\frac{Y}{R_0}\right)^2}} + A_4Y^4 + A_6Y^6 + A_8Y^8 + A_{10}Y^{10} + A_{12}Y^{12}$$ [Formula 1]

Where Y represents the height from the optical axis, X represents a distance from the tangent plane to the apex of aspherical surface of an aspherical shape whose height from the optical axis is Y, $R_0$ represents the radius of curvature of the apex of the aspherical surface, κ represents a conic constant, and A4, A6, A8, A10, and A12 represent 4th-, 6th-, 8th-, 10th-, and 12th order aspherical coefficients, respectively.

The image pickup lens 7 according to the present embodiment is configured to satisfy the following conditional expressions (1) and (2).

$$1.20 < f/Y' < 1.35 \quad (1)$$

$$TL/Y' < 2.0 \quad (2)$$

Where f is the focal length of the overall optical system, Y' is the maximum image height, and TL is the overall length of the optical system (the distance between the apex of the lens surface of the first lens 1 facing the object side (the surface of the aperture stop 5 facing the object side) and the image pickup surface S of the image pickup element along the optical axis (the parallel plate 6 part is assumed to be air)).

The conditional expression (1) is for achieving a size reduction and favorable correction of various aberrations as well as a wide angle of view of up to 70° or higher. When f/Y' is equal to or greater than 1.35, an angle of view of up to 70° or higher cannot be ensured. When f/Y' is equal to or smaller than 1.20, the maximum angle of view is increased to 80° or higher, which makes it difficult to achieve a size reduction and favorable correction of various aberrations.

The conditional expression (2) is for reducing the size of the image pickup lens. When TL/Y' is equal to or greater than 2.0, it is difficult to reduce the overall optical length (size reduction) to the level sought in recent years.

According to the configuration of the image pickup lens 7 of the present embodiment, the image pickup lens 7 is composed of a small number of lenses and satisfies the conditional expression (2), so that a small image pickup lens can be achieved. Further, since the first lens 1 is a biconvex lens, its positive power can be dispersed to each of the lens surfaces. Thus, it is possible to provide an image pickup lens that introduces less aberration and can be reduced in size with ease. Further, the image pickup lens 7 uses the second lens 2 whose lens surface facing the image surface side is concave and the third lens 3 that is a meniscus lens whose lens surface facing the image surface side is convex. Thus, the angle at which a ray enters the second lens 2 and the third lens 3 can be reduced to reduce ray aberration. Further, because the lens surfaces of the fourth lens 4 are both aspherical, distortion and a field curvature can be corrected favorably. Further, because the image pickup lens 7 satisfies the conditional expression (1), a wide angle of view of up to 70° or higher can be achieved.

For the reasons mentioned above, according to the configuration of the image pickup lens 7 of the present embodiment, it is possible to provide an image pickup lens that can provide an angle of view of up to 70° or higher. The image pickup lens also can be reduced in size and various aberrations associated with the lens can be corrected favorably, so that the image pickup lens is compatible with a high-pixel image pickup element (e.g., from a CMOS image sensor having a pixel pitch of 1.75 μm and a pixel count of 5 mega pixels to a CMOS image sensor having a pixel pitch of 1.4 μm and a pixel count of 8 mega pixels) incorporated in a small mobile product, such as a mobile phone.

Further, it is preferable that the image pickup lens 7 according to the present embodiment is configured to satisfy the following conditional expression (3).

$$1.05 < |R11/R12| < 3.0 \quad (3)$$

R11 is the radius of curvature of the lens surface of the first lens 1 facing the object side and R12 is the radius of curvature of the lens surface of the first lens 1 facing the image surface side.

The conditional expression (3) is a conditional expression concerning the shape of the first lens 1 for correcting various aberrations, spherical aberration and axial chromatic aberration in particular, favorably. That is, when the conditional expression (3) is satisfied, the power of the lens surface of the first lens 1 facing the image surface side becomes larger than that of the lens surface facing the object side, which makes it not only possible to reduce the size of the image pickup lens and to provide a wide angle of view, but also to correct various aberrations, spherical aberration and axial chromatic aberration in particular, more favorably.

Further, it is desirable that the image pickup lens 7 according to the present embodiment is configured to satisfy the following conditional expression (4).

$$60 < \nu 1 \quad (4)$$

ν1 is the Abbe's number of the first lens 1 at the d line (587.5600 nm).

In this way, by using a glass lens that satisfies the conditional expression (4) as the first lens 1 having large power, various aberrations, chromatic aberration in particular, can be corrected favorably even if the space between the lenses is reduced. Thus, when the conditional expression (4) is satisfied, the size of the image pickup lens can be reduced further.

In this case, it is desirable that the second lens 2 to the fourth lens 4 are plastic lenses. According to this desirable configuration, the use of low-cost plastic lenses for the second lens 2 to the fourth lens 4 allows a reduction in the cost of the image pickup lens. Further, the use of plastic lenses for the second lens 2 to the fourth lens 4 in this way makes the molding of the lenses including providing an aspherical shape and shaping the edge part easier. And as the flexibility in designing the shape of the edge part increases, the second lens 2 to the fourth lens 4 can be designed to have a structure that prevents a decline in the quality of a captured image resulting from a flare or ghost or the edge part can be designed to have a shape that makes assembly of the image pickup lens easy.

In the image pickup lens 7 according to the present embodiment, it is desirable that the first lens 1 to the fourth lens 4 are all plastic lenses. In this case, it is desirable that the lens surface of the third lens 3 facing the object side is aspherical, and the lens surface of the third lens 3 facing the object side has at least one inflection point at a peripheral portion thereof situated within the effective diameter of the lens surface of the third lens 3 facing the object side and apart from the optical axis. Also in this case, it is desirable that the lens surface of the fourth lens 4 facing the object side has at least one inflection point at a peripheral portion thereof situated within the effective diameter of the lens surface of the fourth lens 4 facing the object side and apart from the optical axis. According to these desirable configurations, it is possible to correct favorably aberration resulting from a ray that forms an image on the periphery of the image pickup surface S of the image pickup element. Thus, the image quality of captured images can be improved further.

Known materials such as borosilicate glass can be used as a glass lens material.

Known materials such as polymethyl methacyrlate (PMMA), polycarbonate resin (PC), cyclic olefin polymer, styrene-based resin, polystyrene resin (PS), and low moisture absorbing acrylic resin can be used as a plastic lens material.

EXAMPLE 1

Hereinafter, the image pickup lens according to the present embodiment will be described in more detail by way of a specific example.

Table 1 below provides a specific numerical example of the image pickup lens in this example.

TABLE 1

| Optical surface | r (mm) | d (mm) | N | ν |
|---|---|---|---|---|
| Aperture stop | ∞ | 0.000 | — | — |
| 1st surface | 2.9625 | 0.986 | 1.4845 | 70.2 |
| 2nd surface | −2.4131 | 0.100 | — | — |
| 3rd surface | 4.525 | 0.380 | 1.607 | 27.5 |
| 4th surface | 1.6291 | 0.738 | — | — |
| 5th surface | −5.4217 | 0.887 | 1.5311 | 55.8 |
| 6th surface | −1.1993 | 0.100 | — | — |
| 7th surface | 5.8636 | 0.774 | 1.5311 | 55.8 |
| 8th surface | 1.1153 | 0.807 | — | — |
| 9th surface | ∞ | 0.500 | 1.5168 | 64.2 |
| 10th surface | ∞ | — | — | — |

In Table 1, r (mm) is the radius of curvature of each optical surface, d (mm) is the thickness of each of the first lens 1 to the fourth lens 4 and the parallel plate 6 on the optical axis or the space between each pairs of adjacent surfaces, N is the refractive index of each of the first lens 1 to the fourth lens 4 and the parallel plate 6 at the d line (587.5600 nm), and ν is the Abbe's number of each of the first lens 1 to the fourth lens 4 and the parallel plate 6 at the d line (the same applies also to Examples 2 and 3 described later). Note that the image pickup lens 7 shown in FIG. 1 is configured based on the data provided in Table 1.

As can be seen from Table 1, the second lens 2 to the fourth lens 4 are plastic lenses (this is clear from the refractive index and the abbe's number of each lens provided in Table 1) so as to reduce the cost. The abbe's number ν1 of the first lens 1 at the d line is 70.2 (see Table 3 below). In this way, by using a glass lens that satisfies the conditional expression (4) as the first lens 1 having large power, the size of the image pickup lens 7 is reduced. That is, the overall optical length TL, which is the distance between the apex of the lens surface of the first lens 1 facing the object side (the surface of the aperture stop 5 facing the object side) and the image pickup surface S of the image pickup element along the optical axis, is 5.31 mm (see Table 3 below).

Tables 2A and 2B below provide aspherical coefficients (including conic constant) of the image pickup lens in this example. In Tables 2A and 2B, it is assumed that, for example, "E+00" and "E−02" represent "$10^{+00}$" and "$10^{-02}$", respectively (the same applies also to Examples 2 and 3 described later).

TABLE 2A

| Optical surface | κ | A4 | A6 |
|---|---|---|---|
| 1st surface | −3.395800E+00 | −1.605063E−02 | −1.775217E−02 |
| 2nd surface | −1.190565E+00 | −5.277988E−03 | −1.839253E−02 |
| 3rd surface | −3.939273E+01 | −2.664002E−02 | 1.480557E−02 |
| 4th surface | −4.688682E+00 | 1.667030E−02 | 3.200116E−03 |
| 5th surface | −2.482154E+01 | 2.235895E−02 | −2.260976E−02 |
| 6th surface | −3.630105E+00 | −5.200594E−02 | 1.363934E−02 |
| 7th surface | 1.283276E+00 | −9.883002E−02 | 1.871959E−03 |
| 8th surface | −4.611259E+00 | −6.158202E−02 | 1.693792E−02 |

TABLE 2B

| Optical surface | A8 | A10 | A12 |
|---|---|---|---|
| 1st surface | −6.375651E−03 | 4.748431E−04 | 4.362010E−10 |
| 2nd surface | 2.428842E−02 | −1.719030E−02 | −5.112581E−03 |
| 3rd surface | 3.191975E−02 | −1.979631E−02 | −5.765508E−04 |
| 4th surface | 7.654280E−03 | 4.990931E−03 | −4.838134E−03 |
| 5th surface | 2.037356E−03 | −1.154134E−03 | 1.266289E−03 |
| 6th surface | −1.010547E−02 | 3.408508E−03 | −1.315153E−04 |
| 7th surface | 4.390132E−03 | 5.697594E−04 | −2.881071E−04 |
| 8th surface | −4.542361E−03 | 7.185683E−04 | −4.683602E−05 |

As can be seen from Tables 2A and 2B, in the image pickup lens 7 in this example, the lens surfaces of the first lens 1 to the fourth lens 4 are all aspherical. It should be noted, however, that the image pickup lens 7 is not particularly limited to this configuration as long as the lens surfaces of the fourth lens 4 are both aspherical.

Table 3 below provides the F number Fno, the focal length f (mm) of the overall optical system, the angle of view 2 ω(°), the maximum image height Y' (mm), the overall optical length TL (mm), and the values of the conditional expressions (1) to (4) concerning the image pickup lens 7 in this example.

TABLE 3

| | |
|---|---|
| Fno | 2.8 |
| f (mm) | 3.826 |
| 2ω (°) | 72.3 |
| Y' (mm) | 2.86 |
| TL (mm) | 5.31 |
| Conditional expression (1) f/Y' | 1.34 |

TABLE 3-continued

| Conditional expression (2) TL/Y' | 1.86 |
| Conditional expression (3) |R11/R12| | 1.23 |
| Conditional expression (4) ν1 | 70.2 |

As can be seen from Table 3, a bright image pickup lens having an F number (Fno) of 2.8 has been achieved. Also, the angle of view 2 ω is 72.3°, meaning that a wide angle of view of up to 70° or higher has been achieved.

Figure 2:
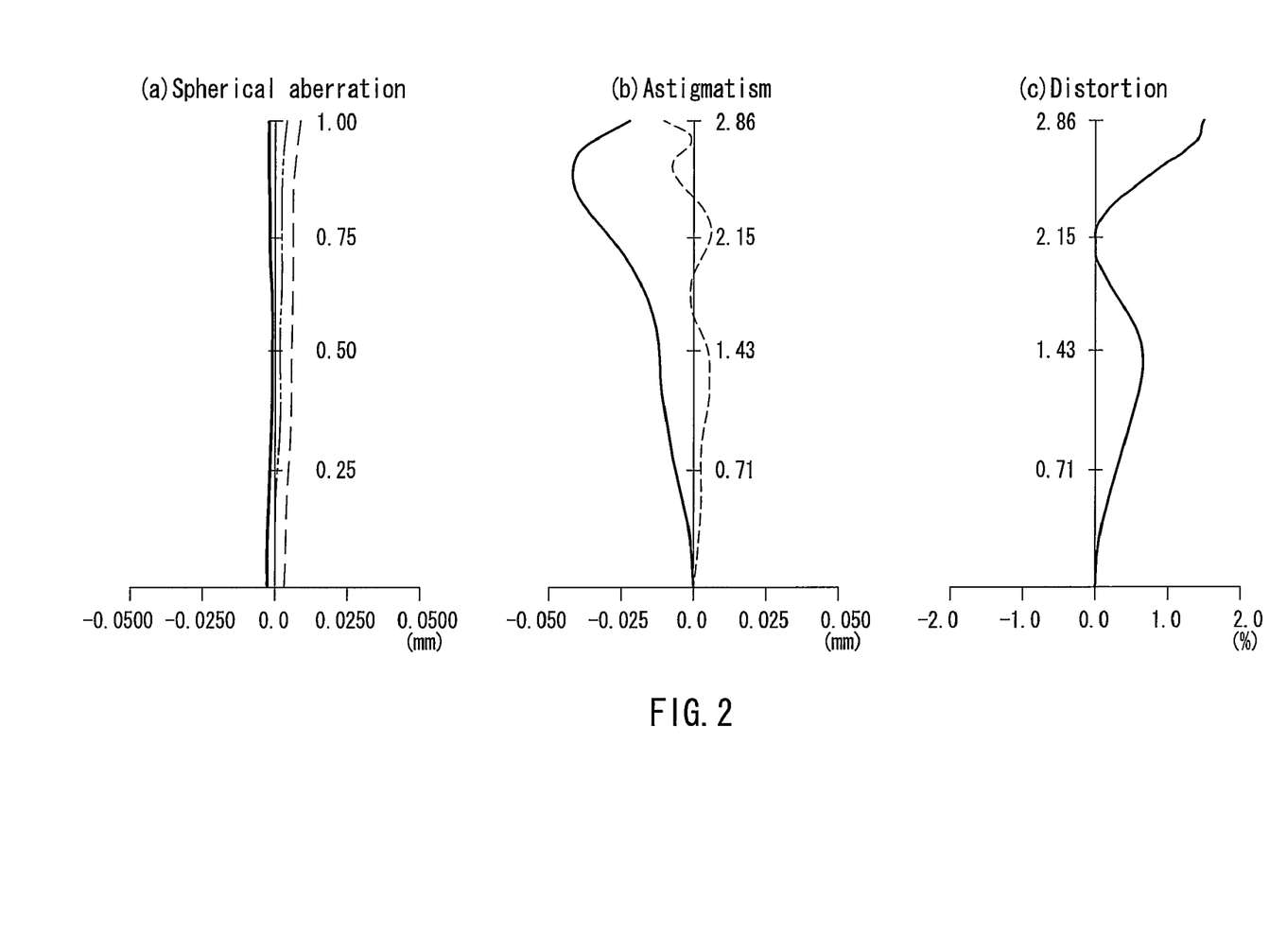
FIG. 2 shows graphs of aberrations associated with an image pickup lens in Example 1 of the present invention.

FIG. 2 shows graphs of aberrations associated with the image pickup lens in this example. FIG. 2(a) is a graph of spherical aberration. In FIG. 2(a), a solid line indicates values at the g line (435.8300 nm), a long dashed line indicates values at the C line (656.2700 nm), a chain double-dashed line indicates values at the d line (587.5600 nm). FIG. 2(b) is a graph of astigmatism. In FIG. 2(b), a solid line indicates a sagittal field curvature and a dashed line indicates a meridional field curvature. FIG. 2(c) is a graph of distortion. Note that axial chromatic aberration can be read from the graph of spherical aberration in FIG. 2(a). The difference between the value of spherical aberration at the d line (chain double-dashed line) and the value of spherical aberration at the g line (solid line) can be referred to as "axial chromatic aberration at the g line relative to the d line".

As can be seen from the graphs of aberration in FIG. 2, various aberrations associated with the image pickup lens 7 in this example, spherical aberration and axial chromatic aberration in particular, can be corrected favorably. Thus, the image pickup lens 7 in this example is compatible with a high-pixel image pickup element (e.g., from a CMOS image sensor having a pixel pitch of 1.75 μm and a pixel count of 5 mega pixels to a CMOS image sensor having a pixel pitch of 1.4 μm and a pixel count of 8 mega pixels) incorporated in a small mobile product, such as a mobile phone.

[Embodiment 2]

Figure 3:
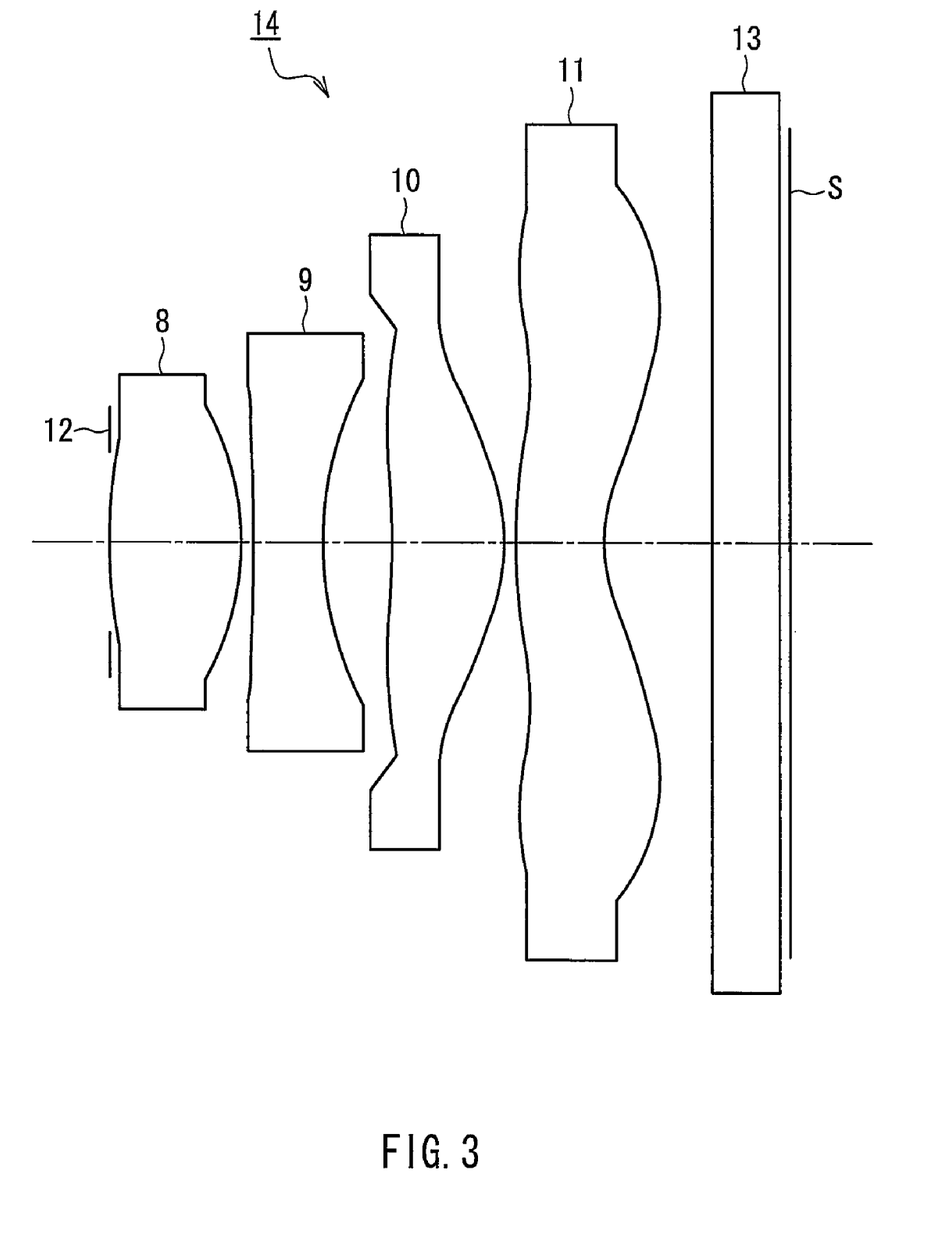
FIG. 3 is a layout drawing showing a configuration of an image pickup lens according to Embodiment 2 of the present invention.

FIG. 3 is a layout drawing showing a configuration of an image pickup lens according to Embodiment 2 of the present invention.

As shown in FIG. 3, an image pickup lens 14 according to the present embodiment includes, in order from the object side (the left side in FIG. 3) to the image surface side (the right side in FIG. 3): an aperture stop 12; a first lens 8 that is a biconvex lens having positive power; a second lens 9 that is a meniscus lens having negative power and whose lens surface facing the image surface side is concave; a third lens 10 that is a meniscus lens having positive power and whose lens surface facing the image surface side is convex; and a fourth lens 11 having negative power, whose lens surfaces are both aspherical and whose lens surface facing the imaging surface side is concave near the optical axis.

A transparent parallel plate 13 similar to the parallel plate 6 in Embodiment 1 is disposed between the fourth lens 11 and the image pickup surface S of the image pickup element.

The image pickup lens 14 according to the present embodiment is also configured to satisfy the conditional expressions (1) and (2).

It is desirable that the image pickup lens 14 according to the present embodiment is also configured to satisfy the conditional expression (3).

It is desirable that the image pickup lens 14 according to the present embodiment is also configured to satisfy the conditional expression (4). In this case, it is desirable that the second lens 9 to the fourth lens 11 are plastic lenses.

Also in the image pickup lens 14 according to the present embodiment, it is desirable that the first lens 8 to the fourth lens 11 are all plastic lenses. In this case, it is desirable that the lens surface of the third lens 10 facing the object side is aspherical, and the lens surface of the third lens 10 facing the object side has at least one inflection point at a peripheral portion thereof situated within the effective diameter of the lens surface of the third lens 10 facing the object side and apart from the optical axis. Also in this case, it is desirable that the lens surface of the fourth lens 11 facing the object side has at least one inflection point at a peripheral portion thereof situated within the effective diameter of the lens surface of the fourth lens 11 facing the object side and apart from the optical axis.

The configuration of the image pickup lens 14 according to the present embodiment also provides the same effects as those provided by the configuration of the image pickup lens 7 according to Embodiment 1.

EXAMPLE 2

Hereinafter, the image pickup lens according to the present embodiment will be described in more detail by way of a specific example.

Table 4 below provides a specific numerical example of the image pickup lens in this example. Note that the image pickup lens 14 shown in FIG. 3 is configured based on the data provided in Table 4.

TABLE 4

| Optical surface | r (mm) | d (mm) | N | ν |
|---|---|---|---|---|
| Aperture stop | ∞ | 0.000 | — | — |
| 1st surface | 3.5261 | 1.067 | 1.5311 | 55.8 |
| 2nd surface | −2.0367 | 0.098 | — | — |
| 3rd surface | 170.3 | 0.566 | 1.607 | 27.5 |
| 4th surface | 1.8725 | 0.572 | — | — |
| 5th surface | −6.9959 | 0.928 | 1.5311 | 55.8 |
| 6th surface | −1.2773 | 0.098 | — | — |
| 7th surface | 3.0277 | 0.718 | 1.5311 | 55.8 |
| 8th surface | 1.0489 | 0.873 | — | — |
| 9th surface | ∞ | 0.500 | 1.5168 | 64.2 |
| 10th surface | ∞ | — | — | — |

As can be seen from Table 4, the first lens 8 to the fourth lens 11 are all plastic lenses (this is clear from the refractive index and the abbe's number of each lens provided in Table 4) so as to further reduce the cost. The overall optical length TL, which is the distance between the apex of the lens surface of the first lens 8 facing the object side (the surface of the aperture stop 12 facing the object side) and the image pickup surface S of the image pickup element along the optical axis, is 5.46 mm (see Table 6 below). The length is somewhat larger than the overall optical length in the case as in Example 1 where a glass lens that satisfies the conditional expression (4) is used as the first lens 1 having large power. Even still, the size of the image pickup lens 14 has been reduced.

Tables 5A and 5B below provide aspherical coefficients (including conic constant) of the image pickup lens in this example.

TABLE 5A

| Optical surface | κ | A4 | A6 |
|---|---|---|---|
| 1st surface | −4.341349E+00 | −2.007021E−02 | −1.106055E−02 |
| 2nd surface | −1.160490E+00 | 1.682378E−02 | −4.383945E−02 |
| 3rd surface | 0.000000E+00 | −4.114429E−02 | 1.786467E−02 |
| 4th surface | −4.744118E+00 | 4.082183E−03 | 3.758854E−03 |

TABLE 5A-continued

| Optical surface | κ | A4 | A6 |
|---|---|---|---|
| 5th surface | −7.906663E+01 | 4.251624E−02 | −1.457058E−02 |
| 6th surface | −4.018732E+00 | −2.968394E−02 | 1.986753E−02 |
| 7th surface | −3.511554E+00 | −7.745550E−02 | 1.323251E−02 |
| 8th surface | −4.292538E+00 | −4.398945E−02 | 9.289002E−03 |

TABLE 5B

| Optical surface | A8 | A10 | A12 |
|---|---|---|---|
| 1st surface | −1.689879E−02 | −6.502420E−03 | 2.140298E−02 |
| 2nd surface | 3.964886E−02 | −1.395177E−02 | −1.142177E−02 |
| 3rd surface | 2.697927E−02 | −1.414375E−02 | −3.818521E−02 |
| 4th surface | 5.057272E−03 | 1.194627E−04 | −1.128436E−03 |
| 5th surface | 3.185188E−03 | −2.189525E−03 | 5.645028E−06 |
| 6th surface | −5.355328E−03 | 2.209976E−03 | −3.555110E−04 |
| 7th surface | −5.785716E−05 | −1.231717E−04 | 5.863425E−06 |
| 8th surface | −1.866142E−03 | 2.012559E−04 | −8.588492E−06 |

As can be seen from Tables 5A and 5B, in the image pickup lens 14 in this example, the lens surfaces of the first lens 8 to the fourth lens 11 are all aspherical. It should be noted, however, that the image pickup lens 14 is not particularly limited to this configuration as long as the lens surfaces of the fourth lens 11 are both aspherical.

Table 6 below provides the F number Fno, the focal length f (mm) of the overall optical system, the angle of view 2 ω(°), the maximum image height Y' (mm), the overall optical length TL (mm), and the values of the conditional expressions (1) to (4) concerning the image pickup lens 14 in this example.

TABLE 6

| | |
|---|---|
| Fno | 2.8 |
| f (mm) | 3.73 |
| 2ω (°) | 74.7 |
| Y' (mm) | 2.86 |
| TL (mm) | 5.46 |
| Conditional expression (1) f/Y' | 1.3 |
| Conditional expression (2) TL/Y' | 1.91 |
| Conditional expression (3) |R11/R12| | 1.73 |
| Conditional expression (4) ν1 | 55.8 |

As can be seen from Table 6, a bright image pickup lens having an F number (Fno) of 2.8 has been achieved. Also, the angle of view 2 ω is 74.7°, meaning that a wide angle of view of up to 70° or higher has been achieved.

As can be seen from Tables 4, 5A, 5B, and 6, in the image pickup lens 14 in this example, the lens surface of the third lens 10 facing the object side has one inflection point at a peripheral portion thereof situated within the effective diameter of the lens surface of the third lens 10 facing the object side and apart from the optical axis, and the lens surface of the fourth lens 11 facing the object side has two inflection points at peripheral portions thereof situated within the effective diameter of the lens surface of the fourth lens 11 facing the object side and apart from the optical axis.

Figure 4:
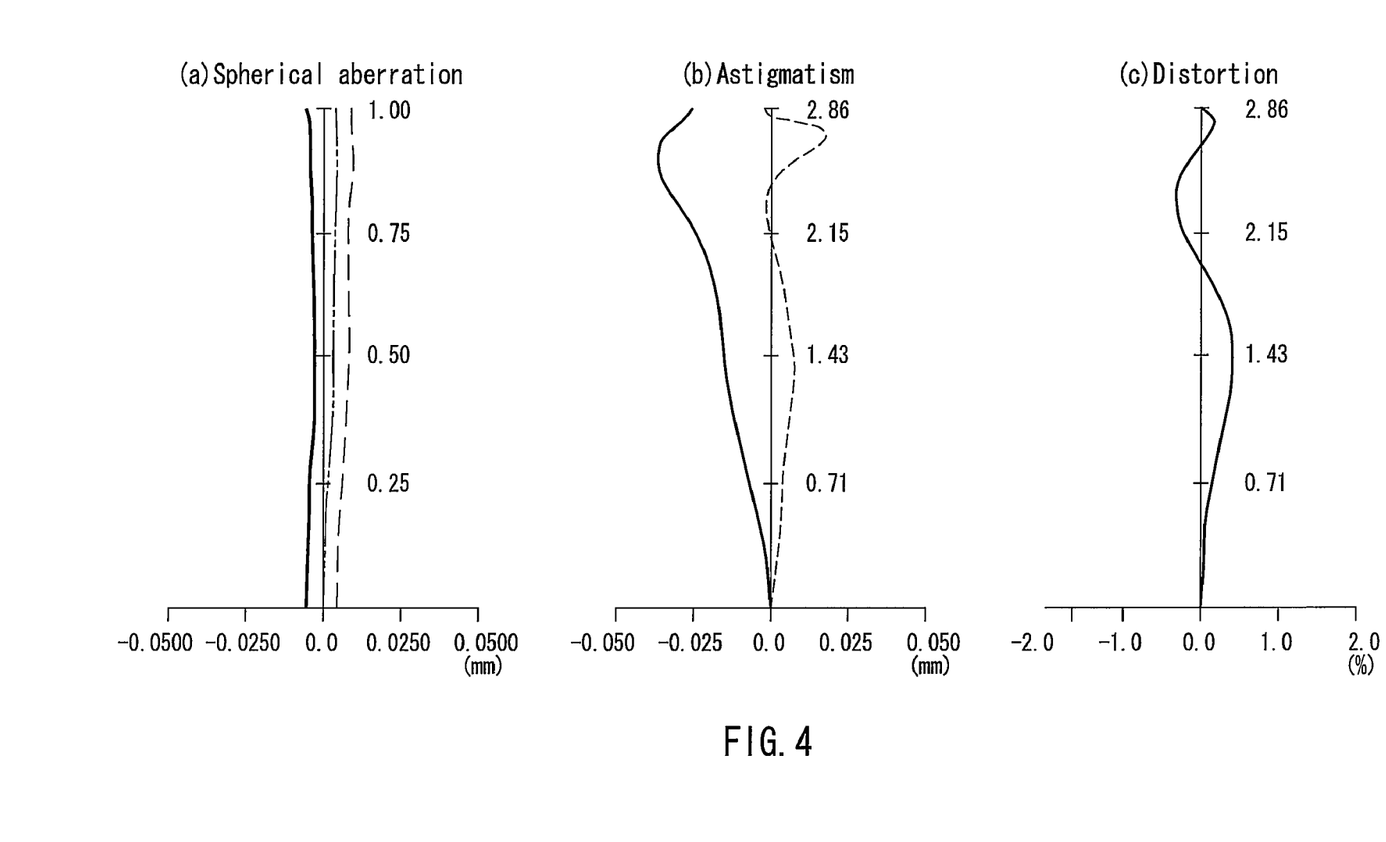
FIG. 4 shows graphs of aberrations associated with an image pickup lens in Example 2 of the present invention.

FIG. 4 shows graphs of aberrations associated with the image pickup lens in this example. FIG. 4(*a*) is a graph of spherical aberration. In FIG. 4(*a*), a solid line indicates values at the g line, a long dashed line indicates values at the C line, and a chain double-dashed line indicates values at the d line. FIG. 4(*b*) is a graph of astigmatism. In FIG. 4(*b*), a solid line indicates a sagittal field curvature and a dashed line indicates a meridional field curvature. FIG. 4(*c*) is a graph of distortion.

As in Example 1, axial chromatic aberration can be read from the graph of spherical aberration in FIG. 4(*a*).

As can be seen from the graphs of aberration in FIG. 4, various aberrations associated with the image pickup lens 14 in this example, spherical aberration and axial chromatic aberration in particular, can be corrected favorably. Thus, the image pickup lens 14 in this example is compatible with a high-pixel image pickup element (e.g., from a CMOS image sensor having a pixel pitch of 1.75 μm and a pixel count of 5 mega pixels to a CMOS image sensor having a pixel pitch of 1.4 μm and a pixel count of 8 mega pixels) incorporated in a small mobile product, such as a mobile phone.

[Embodiment 3]

Figure 5:
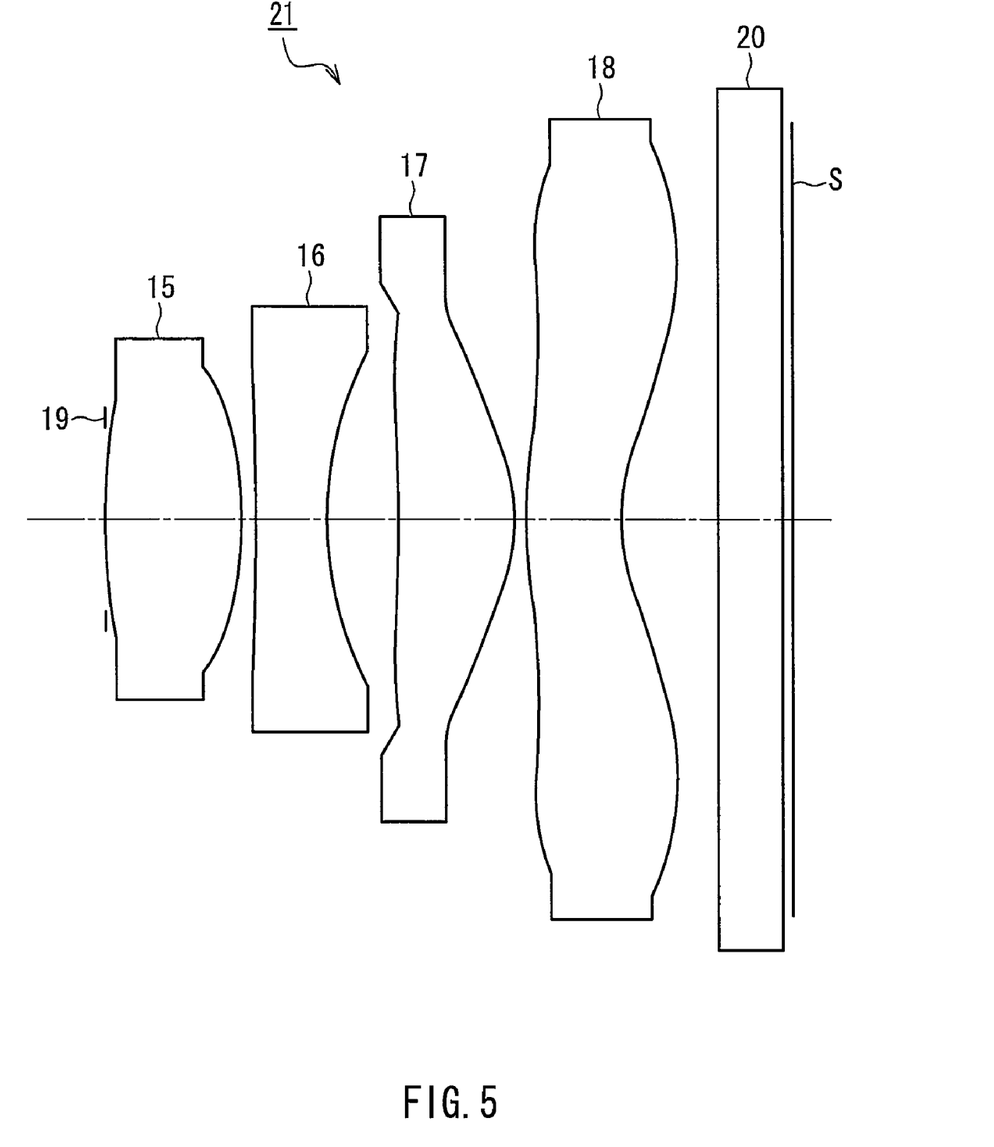
FIG. 5 is a layout drawing showing a configuration of an image pickup lens according to Embodiment 3 of the present invention.

FIG. 5 is a layout drawing showing a configuration of an image pickup lens according to Embodiment 3 of the present invention.

As shown in FIG. 5, an image pickup lens 21 according to the present embodiment includes, in order from the object side (the left side in FIG. 5) to the image surface side (the right side in FIG. 5): an aperture stop 19; a first lens 15 that is a biconvex lens having positive power; a second lens 16 that has negative power and whose lens surface facing the image surface side is concave; a third lens 17 that is a meniscus lens having positive power and whose lens surface facing the image surface side is convex; and a fourth lens 18 that has negative power, whose lens surfaces are both aspherical, and whose lens surface facing the image surface side is concave near the optical axis.

A transparent parallel plate 20 similar to the parallel plate 6 in Embodiment 1 is disposed between the fourth lens 18 and the image pickup surface S of the image pickup element.

The image pickup lens 21 according to the present embodiment is also configured to satisfy the conditional expressions (1) and (2).

It is desirable that the image pickup lens 21 according to the present embodiment is also configured to satisfy the conditional expression (3).

It is desirable that the image pickup lens 21 according to the present embodiment is also configured to satisfy the conditional expression (4). In this case, it is desirable that the second lens 16 to the fourth lens 18 are plastic lenses.

Also in the image pickup lens 21 according to the present embodiment, it is desirable that the first lens 15 to the fourth lens 18 are all plastic lenses. In this case, it is desirable that the lens surface of the third lens 17 facing the object side is aspherical, and the lens surface of the third lens 17 facing the object side has at least one inflection point at a peripheral portion thereof situated within the effective diameter of the lens surface of the third lens 17 facing the object side and apart from the optical axis. Also in this case, it is desirable that the lens surface of the fourth lens 18 facing the object side has at least one inflection point at a peripheral portion thereof situated within the effective diameter of the lens surface of the fourth lens 18 facing the object side and apart from the optical axis.

The configuration of the image pickup lens 21 according to the present embodiment also provides the same effects as those provided by the configuration of the image pickup lens 7 according to Embodiment 1.

EXAMPLE 3

Hereinafter, the image pickup lens according to the present embodiment will be described in more detail by way of a specific example.

Table 7 below provides a specific numerical example of the image pickup lens in this example. Note that the image pickup lens 21 shown in FIG. 5 is configured based on the data provided in Table 7.

TABLE 7

| Optical surface | r (mm) | d (mm) | N | ν |
|---|---|---|---|---|
| Aperture stop | ∞ | 0.000 | — | — |
| 1st surface | 3.5785 | 1.075 | 1.5311 | 55.8 |
| 2nd surface | −2.0134 | 0.099 | — | — |
| 3rd surface | −168.4462 | 0.587 | 1.607 | 27.5 |
| 4th surface | 1.9062 | 0.552 | — | — |
| 5th surface | −6.3557 | 0.911 | 1.5311 | 55.8 |
| 6th surface | −1.2544 | 0.099 | — | — |
| 7th surface | 3.0543 | 0.741 | 1.5311 | 55.8 |
| 8th surface | 1.0519 | 0.842 | — | — |
| 9th surface | ∞ | 0.500 | 1.5168 | 64.2 |
| 10th surface | ∞ | — | — | — |

As can be seen from Table 7, the first lens 15 to the fourth lens 18 are all plastic lenses (this is clear from the refractive index and the abbe's number of each lens provided in Table 7) so as to further reduce the cost. The overall optical length TL, which is the distance between the apex of the lens surface of the first lens 15 facing the object side (the surface of the aperture stop 19 facing the object side) and the image pickup surface S of the image pickup element along the optical axis, is 5.45 mm (see Table 9 below). The length is somewhat larger than the overall optical length in the case as in Example 1 where a glass lens that satisfies the conditional expression (4) is used as the first lens 1 having large power. Even still, the size of the image pickup lens 21 has been reduced.

Tables 8A and 8B below provide aspherical coefficients (including conic constant) of the image pickup lens in this example.

TABLE 8A

| Optical surface | κ | A4 | A6 |
|---|---|---|---|
| 1st surface | −4.693300E+00 | −1.982347E−02 | −1.128440E−02 |
| 2nd surface | −1.167558E+00 | 1.599910E−02 | −4.064795E−02 |
| 3rd surface | 0.000000E+00 | −3.913241E−02 | 1.631289E−02 |
| 4th surface | −4.738156E+00 | 3.956638E−03 | 3.311654E−03 |
| 5th surface | −7.236516E+01 | 4.017278E−02 | −1.327230E−02 |
| 6th surface | −3.847234E+00 | −2.870256E−02 | 1.816544E−02 |
| 7th surface | −3.251764E+00 | −7.240318E−02 | 1.223459E−02 |
| 8th surface | −4.337747E+00 | −4.091895E−02 | 8.366574E−03 |

TABLE 8B

| Optical surface | A8 | A10 | A12 |
|---|---|---|---|
| 1st surface | −1.567235E−02 | −6.178335E−03 | 1.749105E−02 |
| 2nd surface | 3.352266E−02 | −1.214280E−02 | −1.006623E−02 |
| 3rd surface | 2.386324E−02 | −1.236788E−02 | −3.679856E−03 |
| 4th surface | 4.306901E−03 | 5.511591E−05 | −9.669965E−04 |
| 5th surface | 2.819702E−03 | −1.327344E−04 | 2.899918E−05 |
| 6th surface | −4.624330E−03 | 1.937123E−03 | −2.593990E−04 |
| 7th surface | −3.295439E−05 | −1.038379E−04 | 4.741003E−06 |
| 8th surface | −1.642497E−03 | 1.736946E−04 | −6.521814E−06 |

As can be seen from Tables 8A and 8B, in the image pickup lens 21 in this example, the lens surfaces of the first lens 15 to the fourth lens 18 are all aspherical. It should be noted, however, that the image pickup lens 21 is not particularly limited to this configuration as long as the lens surfaces of the fourth lens 18 are both aspherical.

Table 9 below provides the F number Fno, the focal length f (mm) of the overall optical system, the angle of view 2 ω(°), the maximum image height Y' (mm), the overall optical length TL (mm), and the values of the conditional expressions (1) to (4) concerning the image pickup lens 21 in this example.

TABLE 9

| Fno | 2.8 |
|---|---|
| f (mm) | 3.68 |
| 2ω (°) | 75.1 |
| Y' (mm) | 2.86 |
| TL (mm) | 5.45 |
| Conditional expression (1) f/Y' | 1.29 |
| Conditional expression (2) TL/Y' | 1.91 |
| Conditional expression (3) |R11/R12| | 1.78 |
| Conditional expression (4) ν1 | 55.8 |

As can be seen from Table 9, a bright image pickup lens having an F number (Fno) of 2.8 has been achieved. Also, the angle of view 2 ω is 75.1°, meaning that a wide angle of view of up to 70° or higher has been achieved.

As can be seen from Tables 7, 8A, 8B, and 9, in the image pickup lens 21 in this example, the lens surface of the third lens 17 facing the object side has one inflection point at a peripheral portion thereof situated within the effective diameter of the lens surface of the third lens 17 facing the object side and apart from the optical axis, and the lens surface of the fourth lens 18 facing the object side has two inflection points at peripheral portions thereof situated within the effective diameter of the lens surface of the fourth lens 18 facing the object side and apart from the optical axis.

Figure 6:
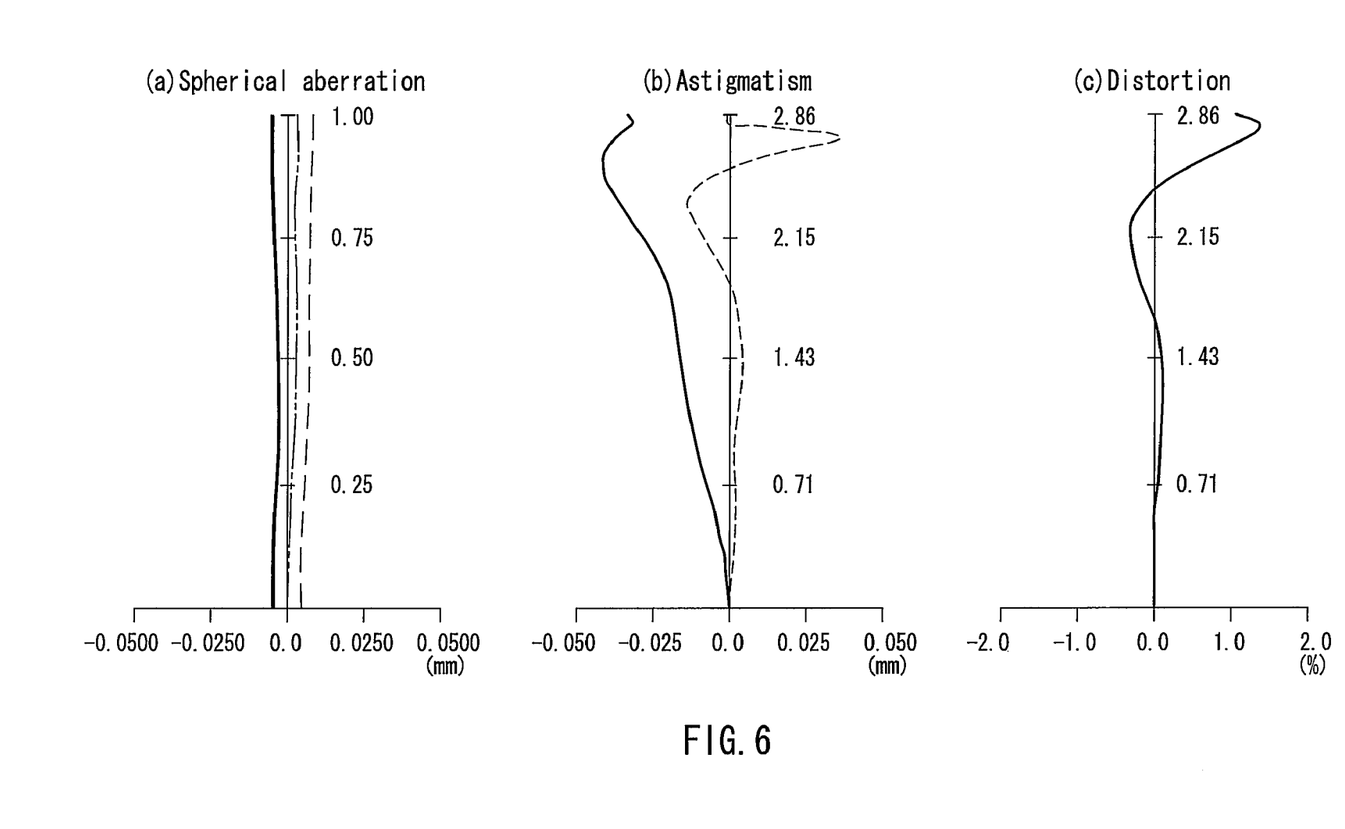
FIG. 6 shows graphs of aberrations associated with an image pickup lens in Example 3 of the present invention.

FIG. 6 shows graphs of aberrations associated with the image pickup lens in this example. FIG. 6(a) is a graph of spherical aberration. In FIG. 6(a), a solid line indicates values at the g line, a long dashed line indicates values at the C line, and a chain double-dashed line indicates values at the d line. FIG. 6(b) is a graph of astigmatism. In FIG. 6(b), a solid line indicates a sagittal field curvature and a dashed line indicates a meridional field curvature. FIG. 6(c) is a graph of distortion. As in Example 1, axial chromatic aberration can be read from the graph of spherical aberration in FIG. 6(a).

As can be seen from the graphs of aberration in FIG. 6, various aberrations associated with the image pickup lens 21 in this example, spherical aberration and axial chromatic aberration in particular, can be corrected favorably. Thus, the image pickup lens 21 in this example is compatible with a high-pixel image pickup element (e.g., from a CMOS image sensor having a pixel pitch of 1.75 μm and a pixel count of 5 mega pixels to a CMOS image sensor having a pixel pitch of 1.4 μm and a pixel count of 8 mega pixels) incorporated in a small mobile product, such as a mobile phone.

INDUSTRIAL APPLICABILITY

The image pickup lens of the present invention can provide an angle of view of up to 70° or higher. The image pickup lens can also be reduced in size and various aberrations associated with the lens can be corrected favorably, so that the image pickup lens is compatible with a high-pixel image pickup element (e.g., from a CMOS image sensor having a pixel pitch of 1.75 μm and a pixel count of 5 mega pixels to a CMOS image sensor having a pixel pitch of 1.4 μm and a pixel count of 8 mega pixels) incorporated in a small mobile product, such as a mobile phone. Thus, the image pickup lens of the present invention is particularly useful in the field of small mobile products equipped with an image pickup element, such as a mobile phone, where an increase in pixel count is desired.

DESCRIPTION OF REFERENCE NUMERALS 1, 8, 15 first lens
2, 9, 16 second lens
3, 10, 17 third lens
4, 11, 18 fourth lens
5, 12, 19 aperture stop
6, 13, 20 parallel plate
7, 14, 21 image pickup lens
S image pickup surface

The invention claimed is:

1. An image pickup lens comprising, in order from an object side to an image surface side:
a first lens that is a biconvex lens having positive power;
a second lens that has negative power and whose lens surface facing the image surface side is concave;
a third lens that is a meniscus lens having positive power and whose lens surface facing the image surface side is convex; and
a fourth lens that has negative power, whose lens surfaces are both aspherical and whose lens surface facing the image surface side is concave near an optical axis,
wherein the image pickup lens satisfies the following conditional expressions (1) to (3), where f is a focal length of an overall optical system, Y' is a maximum image height, TL is an overall length of the optical system, R11 is a radius of curvature of a lens surface of the first lens facing the object side, and R12 is a radius of curvature of a lens surface of the first lens facing the image surface side:

$$1.20 < f/Y' < 1.35 \quad (1)$$

$$TL/Y' < 2.0 \quad (2)$$

$$1.05 < |R11/R12| < 3.0 \quad (3).$$

2. An image pickup device comprising:
an image pickup element for converting an optical signal corresponding to an object into an image signal and outputting the image signal; and
an image pickup lens for forming an image of the object onto an image pickup surface of the image pickup element,
wherein as the image pickup lens, the image pickup device uses the image pickup lens according to claims 1.

3. The image pickup lens according to claim 1, wherein the image pickup lens satisfies the following conditional expression (4), where ν1 is an Abbe's number of the first lens at a d line (587.5600 nm):

$$60 < \nu1 \quad (4).$$

4. The image pickup lens according to claim 3, wherein the second lens to the fourth lens are plastic lenses.

5. The image pickup lens according to claim 1, wherein the first lens to the fourth lens are all plastic lenses.

6. The image pickup lens according to claim 5, wherein a lens surface of the third lens facing the object side is aspherical, and the lens surface of the third lens facing the object side has at least one inflection point at a peripheral portion thereof situated within an effective diameter of the lens surface of the third lens facing the object side and apart from the optical axis.

7. The image pickup lens according to claim 5, wherein the lens surface of the fourth lens facing the object side has at least one inflection point at a peripheral portion thereof situated within an effective diameter of the lens surface of the fourth lens facing the object side and apart from the optical axis.

* * * * *